United States Patent

Burdgick et al.

(10) Patent No.: US 7,588,421 B2
(45) Date of Patent: Sep. 15, 2009

(54) METHODS AND APPARATUS FOR MECHANICAL RETAINMENT OF NON-METALLIC FILLERS IN POCKETS

(75) Inventors: Steven S. Burdgick, Schenectady, NY (US); Christophe Lanaud, Delanson, NY (US); Adegboyega Makinde, Niskayuna, NY (US); Wendy Lin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 11/395,632

(22) Filed: Mar. 31, 2006

(65) Prior Publication Data
US 2007/0231155 A1 Oct. 4, 2007

(51) Int. Cl.
*F01D 5/18* (2006.01)
(52) U.S. Cl. .................................. 416/232; 416/231 R
(58) Field of Classification Search ................ 416/232, 416/227 R, 229 R, 231 R
See application file for complete search history.

(56) References Cited

U.S. PATENT DOCUMENTS

| 5,269,058 | A | * | 12/1993 | Wiggs et al. ............. 29/889.72 |
| 5,429,877 | A | | 7/1995 | Eylon |
| 5,634,771 | A | * | 6/1997 | Howard et al. ............ 416/241 A |
| 5,655,883 | A | | 8/1997 | Schilling |
| 5,755,558 | A | * | 5/1998 | Reinfelder et al. .......... 416/230 |
| 5,839,882 | A | | 11/1998 | Finn et al. |
| 5,931,641 | A | | 8/1999 | Finn et al. |
| 6,033,186 | A | | 3/2000 | Schilling et al. |
| 6,039,542 | A | | 3/2000 | Schilling et al. |
| 6,139,278 | A | | 10/2000 | Mowbray et al. |
| 6,241,471 | B1 | | 6/2001 | Herron |
| 6,287,080 | B1 | | 9/2001 | Evans et al. |
| 6,364,616 | B1 | | 4/2002 | Stevenson et al. |
| 6,607,358 | B2 | | 8/2003 | Finn et al. |
| 6,814,543 | B2 | | 11/2004 | Barb et al. |

* cited by examiner

*Primary Examiner*—Edward Look
*Assistant Examiner*—Dwayne J White
(74) *Attorney, Agent, or Firm*—Armstrong Teasdale LLP

(57) ABSTRACT

A method for making a turbine blade includes providing a bucket in the turbine blade with a plurality of window pockets passing all the way through a wall of the bucket, positioning the window pockets in regions minimizing or at least reducing stress concentrations on the window pockets, and casting a composite comprising a resin matrix and layers of a fabric material in the bucket.

19 Claims, 5 Drawing Sheets

METHODS AND APPARATUS FOR MECHANICAL RETAINMENT OF NON-METALLIC FILLERS IN POCKETS

BACKGROUND OF THE INVENTION

This invention relates generally to steam turbines and more generally to methods and apparatus for retaining material in pockets formed in hybrid buckets and to reducing stresses induced to the buckets.

Turbine buckets (blades) operate in an environment in which they are subject to high centrifugal loads, vibratory stresses, and a varying angle of flow incidence to the bucket. Vibratory stresses are increased when these loads and stresses approach bucket natural resonant frequencies. The magnitude of the vibratory stresses when a bucket vibrates in resonance is proportional to the amount of damping present in the system (wherein damping includes material, aerodynamic and mechanical components) and the stimulus level. For continuously coupled buckets, the frequency of vibration is a function of the entire system of blades, and not necessarily that of individual blades.

A hybrid bucket comprises a turbine bucket (for example, a steam turbine bucket or a gas turbine bucket) made primarily of a metallic substance but with at least one "pocket" of a non-metallic composite filler material. The filler material may comprise a polyimide or another type of polymeric resin (or combinations thereof) with continuous glass, carbon, KEVLAR® or other fiber reinforcement to achieve a composite matrix with the original airfoil surface. Composite matrix are now being designed to be used in units that have high bucket temperatures during windage conditions (low flow, high speed "wind milling" of buckets). However, very stiff high temperature composites do not adhere well to metal.

Many issued patents have been directed to turbine blades fabricated from composite materials. For example, U.S. Pat. No. 5,720,597, entitled "Multi-Component Blade for Gas Turbine," describes gas turbine aircraft blades constructed of metal and foam are provided with a composite skin, an erosion coating, or both, and U.S. Pat. No. 6,139,728, entitled "Poly-Component Blade for a Steam Turbine," discloses configurations similar to those disclosed in U.S. Pat. No. 5,720, 597, but for steam turbines. However, in both of these applications, the size, shape, and location of a pocket to be formed in the bucket is limited. In addition, U.S. Pat. No. 6,042,338, entitled "Detuned Fan Blade Apparatus and Method," describes a "propulsion engine fan" and various types of blades with different pocket locations, but does not disclose blades of essentially one pocket with different rib structures. Further, the disclosure is limited to pockets with radial location from a tip to 5%-38% span and chord wise from 15% to 35% from the leading edge and 20% to 45% from the trailing edge with similar limitations on the second or alternative pocket design. Moreover, none of these patents, describe or suggest the creation of through windows in a pocket for the purpose of mechanical assistance in holding polymer or composite into a bucket.

BRIEF DESCRIPTION OF THE INVENTION

In one aspect, some configurations of the present invention provide A method for making a turbine blade comprising providing a bucket in the turbine blade with a plurality of window pockets passing all the way through a wall of the bucket, positioning the window pockets in regions minimizing or at least reducing stress concentrations on the window pockets, and casting a composite comprising a resin matrix and layers of a fabric material in the bucket.

In another aspect, some configurations of the present invention provide a method for making a turbine blade. The method includes providing a bucket in the turbine blade with a plurality of window pockets passing all the way through a wall of the bucket, positioning the window pockets in regions minimizing or at least reducing stress concentrations on the window pockets, and casting a composite comprising a resin matrix and layers of a fabric material in the bucket.

It will be appreciated that configurations of the present invention provide mechanical assistance in holding polymer or composite into a bucket.

DETAILED DESCRIPTION OF THE INVENTION

As used herein, an element or step recited in the singular and proceeded with the word "a," "an," or "one" (and especially, "at least one") should be understood as not excluding plural said elements or steps, unless such exclusion is explicitly stated. Furthermore, references to "one embodiment" (or to "other embodiments") of the present invention are not intended to be interpreted as excluding either the existence of additional embodiments that also incorporate the recited features or of excluding other features described in conjunction with the present invention. Moreover, unless explicitly stated to the contrary, embodiments "comprising" or "having" an element or a plurality of elements having a particular property may include additional such elements not having that property.

Figure 1:
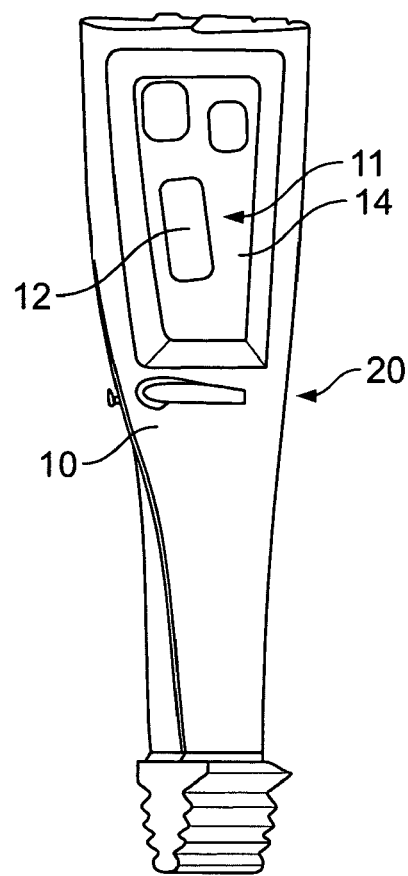
FIG. 1 is a perspective view of a configuration of multiple window pocket in a turbine blade.
Figure 2:
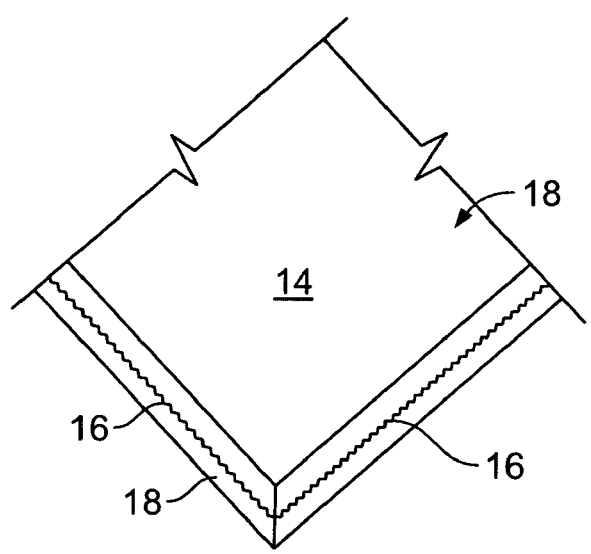
FIG. 2 is a perspective view of a portion of a composite used to fill a pocket such as that shown in FIG. 1.
Figure 3:
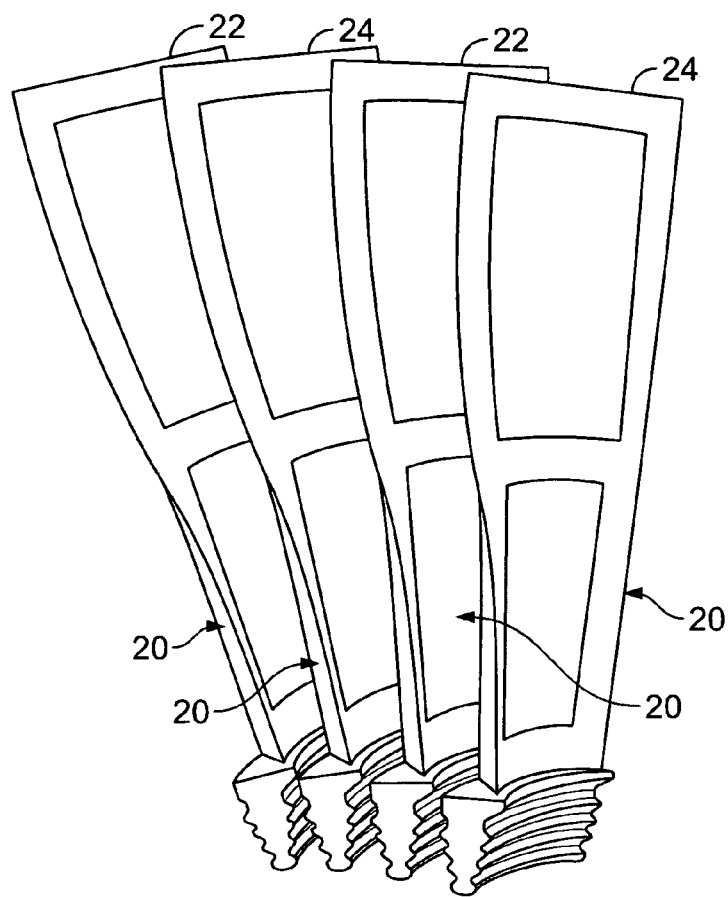
FIG. 3 is a perspective view of some of a plurality of groups of blades that are assembled into a turbine in some configurations of the present invention.

In some configurations of the present invention and referring to FIG. 1 and FIG. 2, a method for tuning a row of continuously coupled or freestanding turbine blades 20 is provided that reduces the amplitude of vibration and/or damping characteristics. The method includes using a directional fiber 16 orientation in a hybrid bucket 10 configuration. Bucket 10 can be made of a metallic base metal with a pocket or pockets 11 that can be filled with a polymer or composite. Polymer or composite 14 can be a polyimide based resin or another suitable type. A composite 14 includes fibers 16, such as glass, carbon, Kevlar® or other fibers, which are bonded, for example, in a resin matrix 18, such as a polyimide based resin matrix. Fibers 16 may be contained in a single layer, in a plurality of layers, in one or more layers of fabric, or throughout matrix 18. The orientation of fibers 16 is selected to tune bucket 10 in a particular fashion and/or may be used to "mixed tune" the set. In other words, the fiber orientation is determined in accordance with a pre-selected tuning of bucket 10. The frequency characteristic is controlled in some configurations of the present invention by tailoring fiber 16 orientation during composite 14 lay up and cure. By fine tuning fiber 16 orientation and/or weave of a fabric 16, some configurations of the present invention control strengths and elastic modulus in different directions in fabric constructed from these fibers. Moreover, the comination of the composite filler material and fiber orientation also facilitate specific tuning and/or damping of buckets in combination with the through window design to allow for structural improvement between the filler and bucket.

Also, in some configurations of the present invention and referring to FIGS. 3 through 7, specific orientations of fibers 16 are used to tune individual bucket 10 frequencies. "Mixed-tuning" comprises combining a particular group 22 with one frequency characteristic with one or more other groups 24 of another frequency. Blade 20 groups 22 and 24 are then assembled (e.g., alternately) in a row so as to achieve improved mechanical damping of a turbine 26 (e.g., a steam or a gas turbine). There may be more than one or two different groups of blades 20 depending upon the desired end result "mixed tuning."

It should be noted that configurations of the present invention can be used with other steam or gas turbine buckets or blades where permitted by the environment (e.g., gas turbine forward stage compressor blades). Some configurations of the present invention facilitate detuning of the natural frequencies and dynamic response of a continuously coupled or freestanding bucket 10 row without changing the aerodynamic shape and efficiency. Also, some configurations of the present invention provide the ability to individually tune a bucket 10 row or to tune specific modes that may not meet design requirements without changing the aerodynamic shape and efficiency.

Some configurations of the present invention provide the ability to tune an individual bucket frequency using composite orientation to control stiffness in a pocketed area of a hybrid bucket without changing the aerodynamic efficiency. Fibers 16 can be oriented in various manners to control the stiffness in the direction that will control specific bucket natural frequency(s). A composite 14 can be designed to have significantly different strength and elastic modulus in different directions based on fiber type, weave, and orientation.

Figure 4:
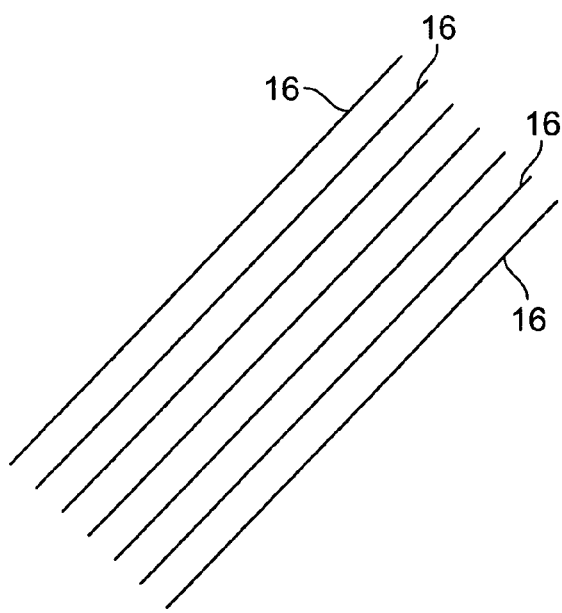
FIG. 4 is an example of a uniaxial fiber orientationl
Figure 5:
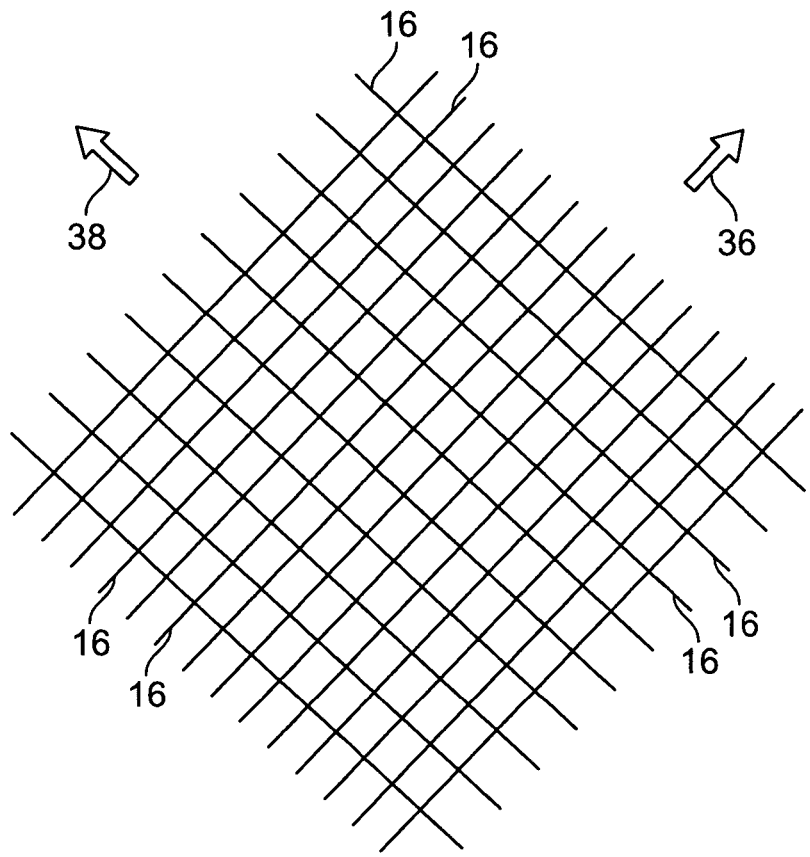
FIG. 5 is an example of a biaxial fiber orientation.
Figure 6:
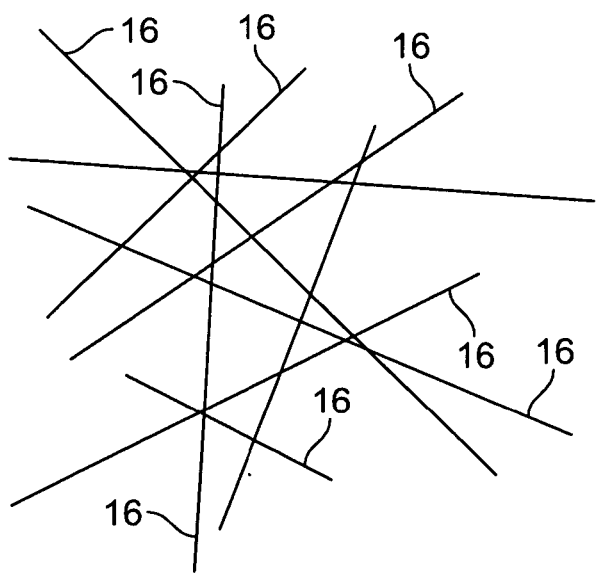
FIG. 6 is an example of a quasi-isotropic fiber orientation.

Referring to FIGS. 4 through 6, some configurations of the present invention provide the ability to suppress the aeroelastic response of a blade row (continuously coupled or freestanding) via mixed-tuning of the natural frequencies of blades 20 within the row. These configurations use a hybrid long bucket 10 design with adjustment of fiber 16 reinforcement stiffness. This adjustment can be accomplished using various combinations of fiber materials 16, weave, and orientation to control stiffness in different directions. Buckets 10 of varying frequency and characteristics can also be used to alter the natural frequency of a blade group. (U.S. Pat. No. 5,931,641, referred to above, describes a hybrid bucket base design.) These configurations of the present invention produce the at least two distinct groups 22 and 24 (see FIG. 3) of blades 20. Each group has the same aerodynamic shape and external profile, but with different composite fillers 14 within pocketed blades 20, thereby intentionally altering the natural frequency of the two (or more) blade groups 22 and 24. For example, in some configurations of the present invention, one group 22 uses a higher strength or "stiffer" composite material 14, while the other group 22 uses a lower stiffness or higher damping material 14. Also for example, in some configurations, a first group 22 uses fibers 16 oriented in one direction (see FIG. 4) and a second group 24 uses fibers 16 oriented in a second direction. Thus, two or more populations of blades 20 are purposefully manufactured and logically assembled so as to utilize their inherent difference in natural frequencies to damp blade response to synchronous and non-synchronous vibrations, without adversely affecting aerodynamic properties of the blade.

In various configurations of the present invention, either fiber orientation, processing technique, or both, are used to change the primary natural frequency of the individual buckets, the particular mode tuning of the continuously coupled bucket row, or both. Thus, in some configurations, the composite lay up has more fibers aligned in a preferred direction, which affects stiffness in a direction of interest to thereby control or shift frequencies. Some configurations of the present invention use several different layers of fabric material oriented in different directions, thereby affecting stiffening in two or more directions, allowing stiffness to be controlled differently in each of these directions.

In some configurations of the present invention and referring to FIG. 6, a quasi-isotropic layup (such as $[0/45/90/-45]_n$, where n is the number of repeating stacking sequences) or randomly oriented long fibers in a matrix (such as sheet molded compounds or "SMCs") is utilized, primarily as a "mixed-tuning" device as described above. At least two distinct sets of buckets and corresponding natural frequency responses are arranged in a fashion selected to reduce the net frequency response of the bucket row.

In some configurations, the fiber orientation is used to mixed tune the bucket row. More particularly, two or more sets of blade groups with recessed portions and/or "pockets" that are primarily along the pressure side of the blade are assembled in a ring. These blade groups comprise a set of buckets in a stage of a turbine. One group of blades has higher resonance frequencies or damping characteristic than the other set or sets. In one example configuration, one group of blades is configured such that one natural frequency is equally disposed between two "per-rev" criteria (4 per rev and 5 per rev split for example), while another group of blades has an alternate fiber lay-up orientation configured to be equally disposed about another set of 'per-rev' stimuli (such as a 3 per rev and 4 per rev split). Inherently different damping and frequency response occurs when using different fiber materials and orientation in the composite resin matrix. The composite fiber fabric is used along with a resin binder to create the desired airfoil shape that existed prior to the "pocketing" operation.

Figure 7:
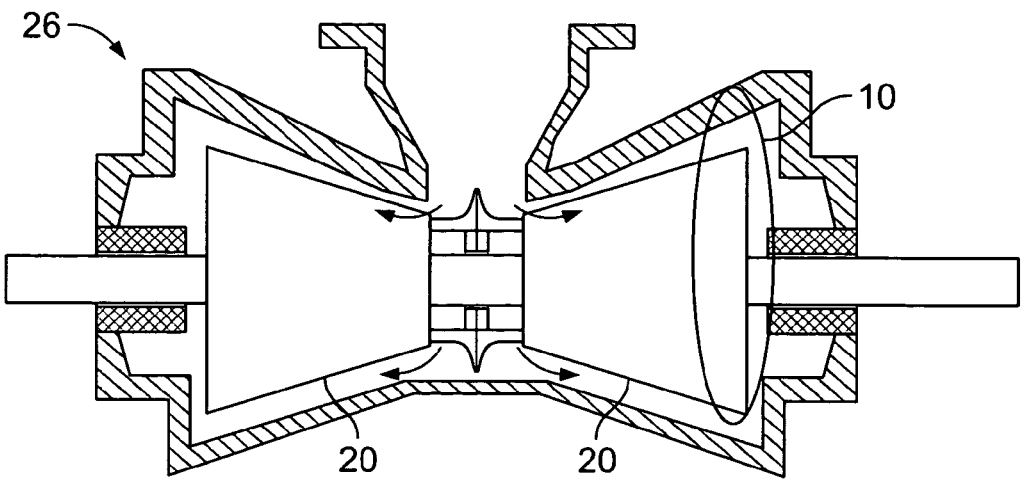
FIG. 7 is a side cut-away view of a two-flow LP steam turbine showing the location of the last stage buckets.

Examples of various blade/pocket geometry configurations are illustrated in the Figures. FIG. 7 illustrates a typical location of low-pressure last stage buckets in a turbine configuration. Configurations of the present invention can be used in multiple stages of a turbine where temperature is low enough and the bucket size is large enough to permit. Configurations of the present invention can also be used in single flow turbine.

Some configurations of the present invention provide a method to reduce shear stress in an adhesive layer between metal and composite as well as to provide a positive mechanical lock of the composite to the bucket. Configurations of the present invention are applicable to composite matrices of one or more different layers of fiber or weave orientation.

Figure 8:
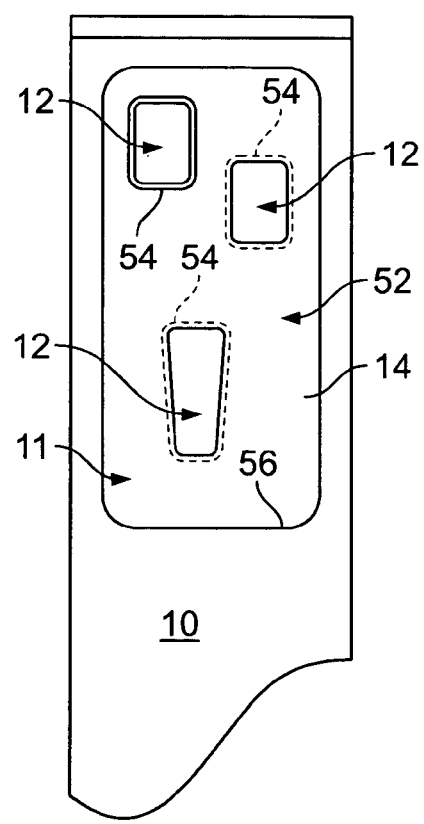
FIG. 8 is a side view of a configuration of a multiple window pocket. The dashed lines in FIG. 8 represent concave interfaces. More particularly, the solid lines surrounding one of the through windows represents a convex interface, while the dashed lines surrounding two of the through windows represent concave interfaces.
Figure 9:
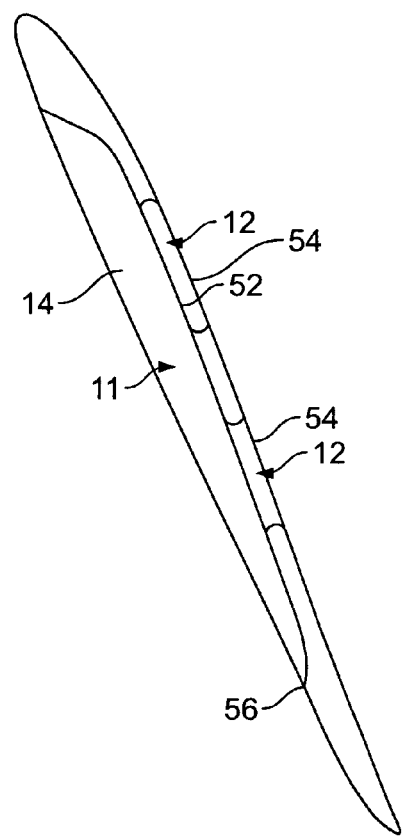
FIG. 9 is a top view of a bucket cross section configuration with multiple windows.

In some configurations of the present invention and referring to FIG. 8 and FIG. 9, a geometric through "window" 12 pocket 11 configuration for a hybrid bucket 10 construction is provided. Pockets 11 in some of these configurations have a gradual incline up to an interface 56 with a flowpath surface 58. Windows 12 assist in positive mechanical attachment of a composite material 14 to a bucket 10. Additionally, windows 12 provide a reduced shear stress in an adhesion layer between composite 14 and metallic bucket 10.

Some configurations of the present invention provide a multiple window 12 configuration that promotes an improved mechanical interface between die layered composite material 14 and a bucket 10. Due to high stiffness of composite material 14, going through a bucket 10 wall is feasible. (In at least one prior art configuration having hybrid buckets, a polymer with low temperature capability and very little stiffness is used. Going through a bucket wall with flexible low temperature polymer in this prior art configuration is not possible.)

In some configurations of the present invention, pocket 11 geometry configurations for a hybrid bucket 10 comprise a plurality of "windows" 12 that extend all the way through bucket wall 52. Windows 12 are either concave or convex around the edge. The selection of a concave or convex configuration can be made empirically, depending upon that which is most beneficial during the composite lamination process and/or that which has the best retainment characteristics. Windows 12 are located in areas 54 selected to minimize or at least reduce stress concentrations on pockets 11 and bucket design. Windows 12 may have various shapes as determined by finite element analysis of a bucket with windows 12. In some configurations, window 12 uses both a concave and convex surface around the edge of the window as determined through empirical testing.

In some configurations of the present invention, composite material 14 comprises a fabric 16, such as glass, carbon, Kevlar or other material, configured in layers using a resin binder/filler 18. Layered composite 14 is made, for example, using pre-impregnated unidirectional or woven fabric tape. One other example of a suitable method for making the layered composite comprises injecting resin over the fibers during casting. A high temperature polyimide base is used in some configurations, but other polymers having high temperature capabilities are also suitable.

Configurations of the metal to filler edge design of the present invention are not restricted to use at leading edges, but are applicable to all edges, including, but not limited to, the outboard or radially outer edge. An inboard edge may see a radial flow field with a high angle of incidence or a pure radial flow from the centrifugal load causing "wet" steam to flow radially outwards. The undercut has a small or large radius, depending upon the thickness of the airfoil near the edge in question. The undercut would be gradually blended into the back wall of the pocket in such a way as to reduce stress concentration.

Some configurations of the present invention have "caul sheets" on both sides of an airfoil while the composite material cures in the pocket. The caul sheet creates the airfoil shape at places at which the pocket has been machined away. Resin fillers are used to recreate the airfoil shape that existed prior to "pocketing."

Additionally, some configurations of the present invention provide a method for adding an additional mechanical attachment of composite material into a bucket pocket, thereby reducing shear stress in an adhesive layer between the composite and a metallic airfoil. Moreover, some configurations of the present invention facilitate improving the stress level in a bucket such that the bucket may be formed with a longer bucket length or chord width near the free end.

Some configurations of the present invention also add positive mechanical retainment of the composite matrix in the bucket.

Thus, to summarize, and referring again to FIG. 1 and FIG. 2, some configurations of the present invention provide a method for reducing stress in a turbine bucket 10 comprising a metallic base metal. The method includes filling a pocket or pockets 11 in bucket 10 with a polymer or composite 14 having continuous fibers 16 in a resin matrix 18. Fibers 16 have an orientation determined in accordance with a pre-selected frequency tuning of the bucket.

Referring to FIGS. 3 through 7, this method can be repeated for a plurality of turbine blade buckets 10 in a plurality of turbine blades 20, wherein the pre-selected frequency tuning of buckets 10 is different between at least a first group 22 of blades 20 and a second group 24 of blades 20. Furthermore, some methods include assembling first group 22 of blades 20 and second group 24 of blades 20 to achieve a mechanical damping of a turbine 26. The method can also include assembling blades 20 from first group 22 alternately with blades 20 from second group 24. Also, in some configurations, the plurality of turbine blades 20 have the same external aerodynamic shape and profile, and blades 20 include at least two groups 22 and 24, one group 24 having either or both a higher strength or stiffer composite 14 in buckets 10 than the other group or groups 24. In some configurations of the present invention in which the plurality of turbine blades 20 have the same external aerodynamic shape and profile and blades 20 comprise at least two groups 22 and 24, the method further includes orienting fibers 16 in resin matrix 18 in a different direction in one group 22 than in the other group or groups 24.

Figure 10:
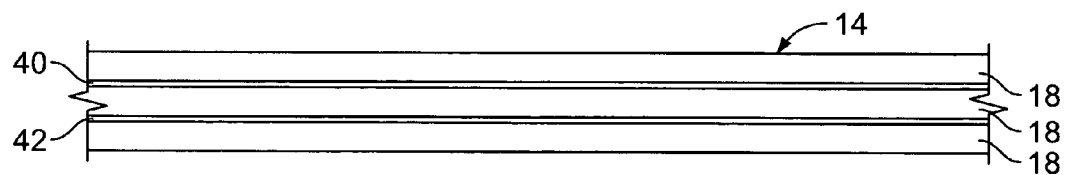
FIG. 10 is a partial side view of a configuration of composite filler having a plurality of fabric layers.

Referring to FIGS. 4 through 6, some configurations of the present invention further include filling composite 14 with fibers 16 oriented in at least two directions, with more fibers oriented in a first, preferred direction 36 than in a different, second direction 38. Also, referring to FIG. 10, some configurations of the present invention include filling composite 14 with a plurality of different layers 40 and 42 of fabric material with fiber 16 in the different layers oriented in different directions. Composite 14 can comprise a quasi-isotropic layup 46, and the method can further include arranging two distinct sets of buckets 48, 50 in a configuration to reduce a net frequency response of a bucket row. In some configurations, the composite includes randomly oriented long fibers 16 in a matrix 18, and the method includes arranging two distinct sets of buckets in a configuration to reduce a net frequency response of a bucket row.

In another aspect and referring again to FIGS. 1 through 7, some configurations of the present invention provide a tuned turbine blade 20. The blade has at least one bucket 10 that includes a metallic base metal with a pocket or pockets 11 filled with a polymer or composite 14 having continuous fibers 16 bonded in a resin matrix 18. Fibers 16 have an orientation determined in accordance with a pre-selected frequency tuning of the bucket. Some configurations of the present invention include a plurality of turbine blades 20, including at least a first group 22 of blades 20 having buckets 10 tuned to a first frequency and a second group 24 of blades 20 having buckets 10 tuned to a different, second frequency. Blades 20 are assembled to achieve a mechanical damping of a gas or steam turbine 26. In some configurations, the plurality of buckets 10 consists of only first group 22 and second group 24, and blades 20 having buckets 10 of first group 22 are assembled alternately with blades 20 having buckets 10 of second group 24. Some configurations of the present invention include a plurality of turbine blades 20 having the same external aerodynamic shape and profile, and blades 20 include at least two groups 22 and 24, each group having a different composite 14 within buckets 10. Yet additional configurations of the present invention include a plurality of turbine blades 20 having the same external aerodynamic shape and profile, and the blades comprise at least two groups 22 and 24. In these configurations, one group 22 has either a higher strength and/or a greater stiffer composite 14 in buckets 10 than the other group or groups 24. Yet other configurations include plurality of turbine blades 20 having the same external aerodynamic shape and profile. However, blades 20 comprise at least two groups 22 and 24, wherein one group 22 has fibers 16 oriented in a different direction than the other group or groups 24.

Some configurations of the present invention provide a turbine blade 20 wherein composite 14 has fibers 16 oriented in at least two directions, with more of fibers 16 oriented in a first, preferred direction 36 than in a different, second direction 38. Also, and referring to FIG. 10, some configurations of the present invention provide a turbine blade 20 wherein composite 14 comprises a plurality of different layers 40 and 42 of fabric material with fiber 16 in the different layers 40 and 42 oriented in different directions.

Yet other configurations of the present invention provide a plurality of turbine blades 20 wherein composite 14 comprises either a quasi-isotropic layup 46 or randomly oriented long fibers 16 in a matrix 18. At least two distinct sets buckets 10 are arranged in a configuration to reduce a net frequency response of a bucket row.

Still another configuration of the present invention provides a turbine blade 20 having a bucket 10 with a plurality of window pockets 11 passing all the way through a wall 52 of bucket 10. Windows 12 are positioned in regions 54 minimizing or at least reducing stress concentrations on window pockets 11, and blade 20 further comprises a composite material 14 that includes a resin matrix 18 and layers of a fabric material 44.

It will be appreciated that configurations of the present invention provide mechanical assistance in holding polymer or composite into a bucket. It will also be appreciated that the present invention enhances the strength of the outer bucket section such that bucket stress levels are facilitated to be reduced, and to facilitate specifically tuned bucket or damped configurations.

While the invention has been described in terms of various specific embodiments, those skilled in the art will recognize that the invention can be practiced with modification within the spirit and scope of the claims.

What is claimed is:

1. A turbine blade comprising at least one pocket formed within said blade, said at least one pocket comprising:
   a composite formed within said at least one pocket, said composite comprising a resin matrix and a plurality of layers of a fabric material, and
   at least one window extending all the way through a wall of said pocket, said at least one window positioned to facilitate reducing stress concentrations induced to said at least one pocket.

2. A turbine blade in accordance with claim 1 wherein said at least one window is positioned in regions to facilitate minimizing stress concentrations within said blade.

3. A turbine blade in accordance with claim 2 wherein said at least one window is positioned in accordance with a finite element analysis of said blade with said at least one pocket.

4. A turbine blade in accordance with claim 1 wherein said composite comprises a fabric material situated in layers and a resin binder.

5. A turbine blade in accordance with claim 4 wherein said fabric material comprises at least one of glass, carbon, and fabric including glass fibers.

6. A turbine blade in accordance with claim 4 wherein said fabric material comprises at least one of a pre-impregnated unidirectional and woven fabric tape with the resin binder injected over the fibers during casting.

7. A turbine blade in accordance with claim 4 wherein said resin binder comprises a high temperature polymer.

8. A turbine blade in accordance with claim 7 wherein said high temperature polymer comprises a polyimide.

9. A turbine blade in accordance with claim 1 wherein said at least one window is defined by outer edges, said at least one window is one of concave and convex around its edges.

10. A turbine blade in accordance with claim 1 wherein said at least one window is located adjacent a leading edge of said turbine blade.

11. A turbine blade in accordance with claim 1 wherein said at least one window is located adjacent a radially outer edge of said turbine blade.

12. A method for making a turbine bucket comprising:
    forming at least one pocket within the turbine bucket;
    positioning a composite comprising a resin matrix and layers of a fabric material in the at least one pocket; and
    forming a plurality of windows that each extend all the way through a wall of the at least one pocket, wherein the plurality of windows are positioned in regions that facilitate reducing stress concentrations on the at least one pocket.

13. A method in accordance with claim 12 further comprising forming the plurality of windows in regions that facilitate at least one of reducing stress concentrations induced to the bucket, facilitate increasing load carrying capability between the bucket and the filler, and facilitate improving the mechanical attachment of the filler.

14. A method in accordance with claim 13 wherein forming the plurality of windows comprises performing a finite element analysis of the bucket with the at least one pocket.

15. A method in accordance with claim 12 wherein positioning a composite comprises inserting a composite comprising a fabric material situated in layers and a resin binder in the at least one pocket.

16. A method in accordance with claim 15 wherein inserting a composite comprising a fabric material comprises inserting a resin binder that is a high temperature polymer within the at least one pocket.

17. A method in accordance with claim 12 further comprising forming the plurality of windows with edges that are one of concave or convex around their edges.

18. A method in accordance with claim 12 further comprising forming the plurality of windows at a leading edge of the bucket.

19. A method in accordance with claim 12 further comprising forming the plurality of windows at a radially outer edge of the turbine bucket.

* * * * *

UNITED STATES PATENT AND TRADEMARK OFFICE
CERTIFICATE OF CORRECTION

PATENT NO. : 7,588,421 B2 Page 1 of 1
APPLICATION NO. : 11/395632
DATED : September 15, 2009
INVENTOR(S) : Burdgick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this

Twenty-first Day of September, 2010

David J. Kappos
*Director of the United States Patent and Trademark Office*